(No Model.)
W. T. CARROLL.
SHAFT HANGER.
No. 373,337. Patented Nov. 15, 1887.
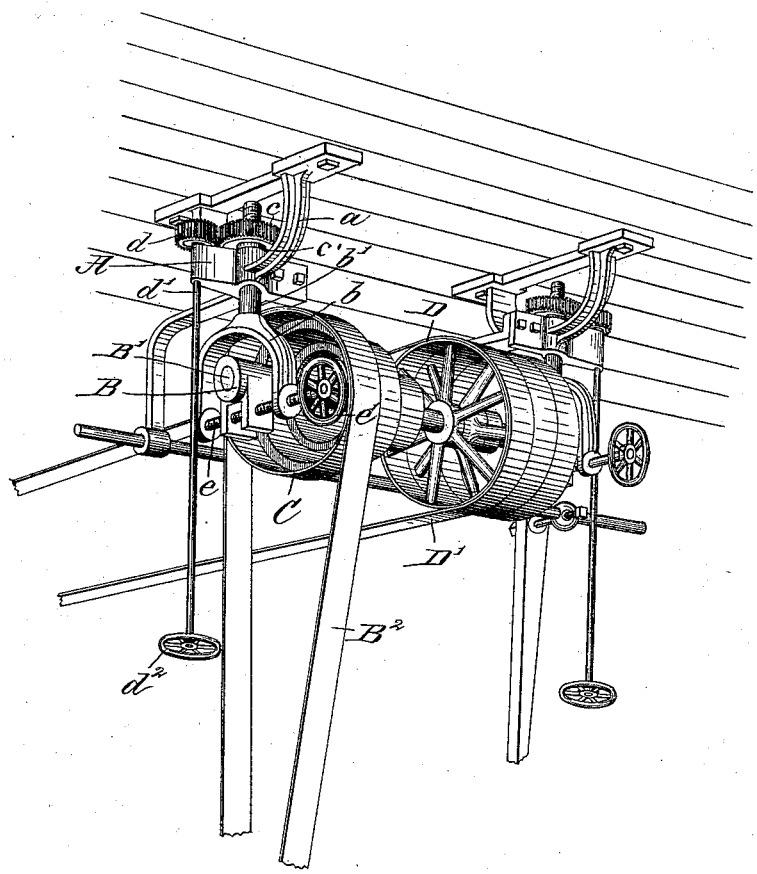
Witnesses.
Arthur Zipperlen.
John F. C. Preinkert
Inventor.
William T. Carroll.
by Crosby & Gregory
attys.

UNITED STATES PATENT OFFICE.

WILLIAM T. CARROLL, OF WORCESTER, MASSACHUSETTS.

SHAFT-HANGER.

SPECIFICATION forming part of Letters Patent No. 373,337, dated November 15, 1887.

Application filed October 7, 1886. Serial No. 215,540. (No model.)

*To all whom it may concern:*

Be it known that I, WILLIAM T. CARROLL, of Worcester, county of Worcester, and State of Massachusetts, have invented an Improvement in Adjustable Shaft-Hangers, of which the following description, in connection with the accompanying drawing, is a specification, like letters on the drawing representing like parts.

This invention has for its object to construct an adjustable hanger for shafting, by which a shaft may be moved to thereby move the belt-pulley carried by it, with relation to another belt-pulley carried by another shaft and about which a belt is passed, so that the slack of a belt may be taken up at any time without stopping the machine.

In accordance with this invention the yoke carrying the bearing-block for the shaft is provided with a screw-threaded shank, which passes loosely through a stationary frame or hanger, and said shank has applied to it a toothed nut, the under side of which takes a seat or bearing against the upper side of the said stationary frame or hanger and sustains the weight of the said yoke. Means are provided for rotating said toothed nut from a distant point—as, for instance, from the floor of the mill—to thereby raise and lower the yoke carrying the bearing-block for the shaft. The bearing-block for the shaft is mounted upon a screw-threaded rod extended through the lower ends of the yoke at right angles to its threaded shank, the block being held in upright or other position by the shaft, so that as the screw-threaded rod is turned the said bearing-block is caused to move back and forth horizontally to take up the slack of the horizontally-moving belt.

The drawing shows in perspective a shaft-hanger and adjusting devices therefor constructed in accordance with this invention.

The U-shaped stationary frame or hanger $a$ is herein shown as attached to the ceiling of a room; but it may be attached to any other fixed point. The frame $a$ receives through it loosely the screw-threaded shank $b'$ of the yoke $b$, the shank having applied to it a toothed nut, $c$, which takes a seat or bearing on the frame $a$. The yoke $b$, having the shank $b'$, carries the bearing-block B for the shaft B', said shank $b'$ passing upward loosely through the U-shaped frame, so as to be moved vertically therein.

The shank $b'$ within the U-shaped frame is provided with screw-threads, upon which is turned a toothed nut, $c$, said toothed nut bearing against the interior or on a collar, $c'$, resting upon the said frame or upper side of the U-shaped frame and actually sustaining the weight of the yoke $b$.

The bearing-block B for the shaft is mounted upon a screw-threaded rod, $e$, having its bearings in the lower ends of the yoke $b$, said bearing-block being held in upright position by the shaft B', upon which the pulleys C are fixed.

A toothed wheel, $d$, fixed to a vertical rod or shaft, $d'$, having its bearings in the framework A, meshes with the toothed nut $c$, the said shaft $d'$ being of sufficient length to be reached by a person standing upon the floor, and being provided, preferably, with a hand-wheel, $d^2$, by which it may be turned. As the rod or shaft $d'$ is rotated, it will be seen that the toothed nut $c$ will also be rotated, thereby raising or lowering the yoke $b$, giving to the shaft B' a vertical movement, that the pulley, C, carried by it may be moved to take up the slack in the belt $B^2$.

The rod $e$ has a hand-wheel, $e'$, by which it may be turned, and as the bearing-block is held in fixed upright position by the shaft B' it follows that by rotating the rod $e$ the bearing-block may be caused to move upon the said rod, and thereby move the shaft B horizontally.

Instead of employing a hand-wheel, $e'$, by which to rotate the screw-threaded rod $e$ any other means more readily accessible may be employed. As the shaft B' is thus moved horizontally the pulley, D, carried by it is moved away from a companion pulley over which the belt D' passes to thus take up any slack in the said belt.

I do not desire to limit myself to the specific means herein shown for carrying out this invention, as it is obvious that the same may be varied and yet a vertical or a horizontal adjustment, or both, may be given to the main shaft B'.

I claim—

In a shaft-hanger, the pulley-shaft B', the bearing-block B, mounted upon the screw-threaded adjusting-rod $e$, having a hand-wheel, $e'$, the yoke $b$, having a screw-threaded shank, $b'$, which passes through the stationary frame $a$, and the toothed weight-supporting nut $c$, fitted on the shank $b'$ and resting on the collar $c'$ on the stationary frame $a$, combined with the toothed wheel $d$ upon the vertical rod $d'$, which has its bearings in the frame-work A, and the hand-wheel $d^2$ on the lower end of the rod $d'$, whereby the horizontal and vertical adjustment of the pulley-shaft B' is accomplished, substantially as described.

In testimony whereof I have signed my name to this specification in the presence of two subscribing witnesses.

WILLIAM T. CARROLL.

Witnesses:
THOMAS G. KENT,
F. H. CHAMBERLAIN.